United States Patent Office
2,940,888
Patented June 14, 1960

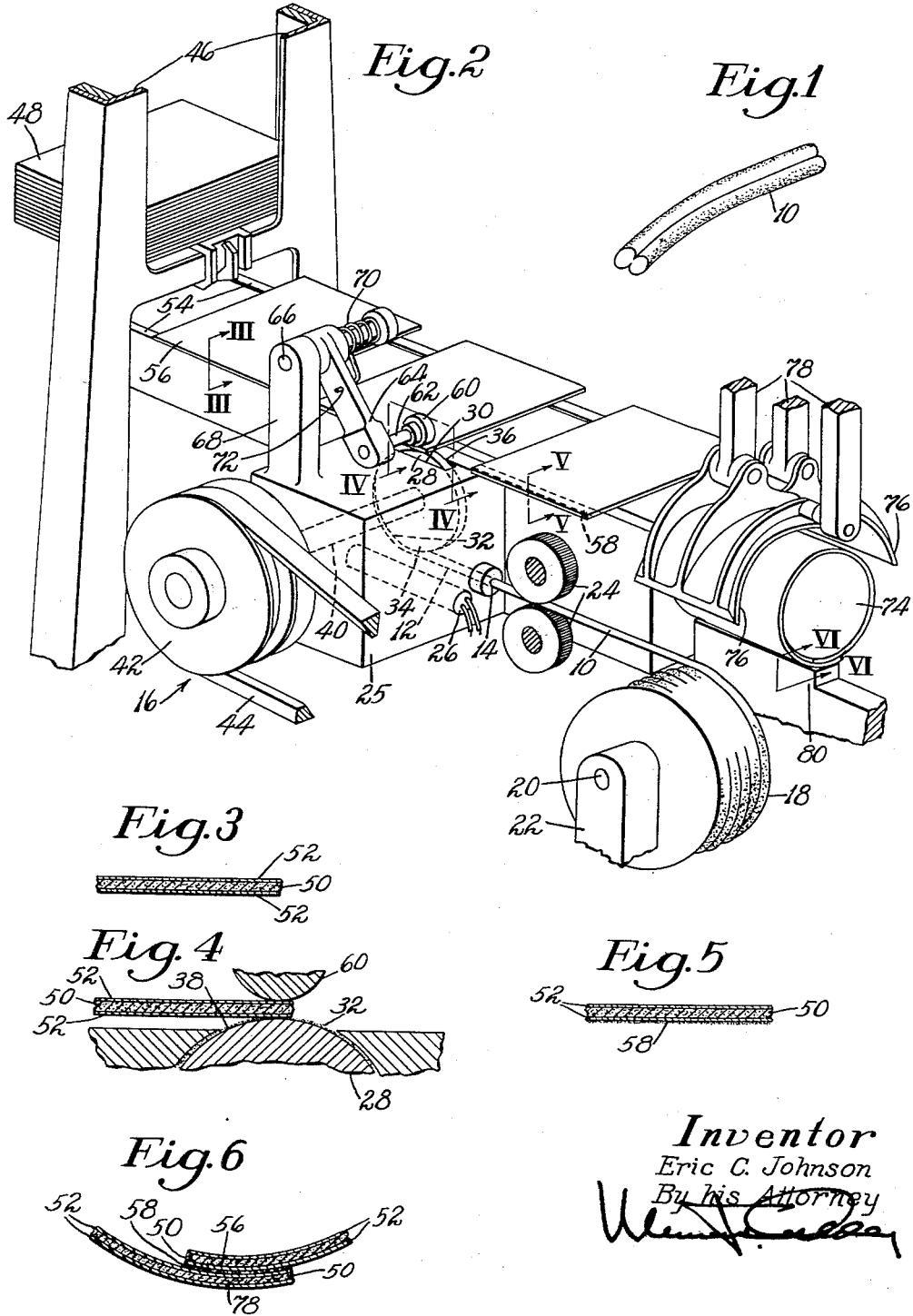

2,940,888

THERMOPLASTIC ROD ADHESIVES AND METHOD OF BONDING METALLIC SHEET MATERIAL THEREWITH

Eric C. Johnson, Somerville, Mass., assignor to B. B. Chemical Co., Boston, Mass., a corporation of Massachusetts Filed Oct. 11, 1955, Ser. No. 539,770

7 Claims. (Cl. 154—129)

This invention relates to an article and method for supplying and dispensing heat softened materials and particularly to thermoplastic rod adhesives and their use in bonding metallic sheet material.

Cylindrical fiber containers with crimped-on metal ends have gone into extensive use for the packaging of food products such as ready-to-bake biscuits and comparable nonliquid foods. The fiber cylindrical portion of the containers has in general been formed of spirally wound fibrous material formed as a long tube on a mandrel and thereafter subdivided into lengths suitable for the desired containers.

It has been desired to use low cost fibrous containers for packaging liquid materials such as fruit juices, but successful packaging of such materials requires a metal lining which it has not been practicable to provide in spiral wound cardboard containers.

Efforts to manufacture side seamed metal foil coated fiber cylindrical containers have been unsuccessful because of the difficulty of forming a satisfactorily strong bond at the overlapping edges of the foil coated fiber at a commercially acceptable rate.

It is a feature of the present invention to provide an adhesive as an elongated body or rod useful in a direct through feed cementing system for forming a strong bond at a high rate between metal or metal foil coated fiber sheets and to provide a method of bonding metal or metal foil coated fiber sheets using such adhesive.

It is a further feature to provide an elongated supply body or rod and a method employing the body or rod for supplying a heat softened mixture of incompatible materials.

The rod or supply body of the present invention is a heat softenable intimate mixture of components which may be resins, natural or synthetic rubbers, fillers, plasticizers and the like. Where the rod is an adhesive for bonding metal or metal foil coated fiber sheets, the rod may comprise a mixture in certain ranges of relative proportions of a polyepoxide resin and a thermoplastic carrier substantially nonreactive with the polyepoxide resin. A preferred thermoplastic carrier is a mixture of a rubbery polymer, polyethylene, and a hydocarbon resin having at elevated temperatures at least limited solvent power toward the polyethylene.

The components of the rod or supply body may be compatible, that is, capable of remaining indefinitely in solution or intimate mixture in molten condition or may be incompatible, that is, may tend to separate when the adhesive is held in molten condition. Where the components of the rod are incompatible they will nevertheless be held in admixture in the solid rod prior to softening and will be maintained in admixture and brought to heat softened fluid condition in a confined heating zone of restricted cross sectional area for application. The advantages of the supply body or rod of an intimate mixture of incompatible components and the procedure of softening and dispensing the rod while maintaining the intimate mixture are not limited to dispensing adhesives but are useful in other relationships such as coatings.

The invention will be described further in connection with the drawings forming part of the disclosure, in which, Fig. 1 is an angular view of a portion of a rod or supply body composed of a heat softenable intimate mixture of materials according to the present invention;

Fig. 2 is a partial angular view of a container-forming device for practicing the method of the present invention in forming and bonding containers with an adhesive rod;

Fig. 3 is a cross sectional view on a somewhat enlarged scale taken on the line III—III of Fig. 2 showing metal foil coated fiber sheet material for forming into the containers using a rod adhesive according to the present invention;

Fig. 4 is a sectional elevational view with parts broken away and on a somewhat enlarged scale taken on the line IV—IV of Fig. 2 and showing the application of adhesive to a metal foil coated sheet;

Fig. 5 is a sectional view taken on the line V—V of Fig. 2 and on a somewhat enlarged scale showing a metal foil coated sheet carrying adhesive deposited on the foil; and Fig. 6 is a somewhat enlarged sectional view taken on the line VI—VI of Fig. 2 and showing the adhesive joint between overlapped portions of a metal foil coated fiber sheet container.

As explained more fully in the copending application of Thomas C. Morris and Eric C. Johnson, entitled "Thermoplastic Adhesive Rods or Strips," Serial No. 377,162, filed August 28, 1953, direct through feed adhesive dispensing is a system wherein an elongated self-supporting body or rod 10 of solid thermoplastic adhesive having a substantially uniform cross section and special "brittle point" and dimensional stability characteristics is fed into a heating zone, e.g. a heated softening and dispensing passageway 12 of which the cross section of the entrance 14 is complementary to the cross section of the adhesive rod. Forward portions of the adhesive rod are softened or melted in the passageway to bring the adhesive to condition for application to a surface to be bonded. Following portions of the rod bear uniformly against the full cross section of adhesive in the passageway to provide a sweeping action and both the softened and unsoftened portions of the adhesive move in orderly fashion through the passageway.

It has now been found that special adhesive or other heat softenable compositions in which, in molten condition, one component may be incompatible with other components may be provided as an elongated slender body of uniform cross section, and may be brought to softened condition without separation. This is accomplished by feeding a forward portion of the body to an elongated heating zone and confining the material in the heating zone to a cross sectional area not substantially greater than that of the body or rod. The material is softened to fluid condition in the heating zone but separation of the components is prevented by the confining action in the heating zone and the sweeping effect of the following portions of rod fed to the heating zone. For effective maintenance of compatible components in initimate mixture it is important that the rod be of relatively small diameter, that is, from about ⅛″ to not substantially more than ¼″ in thickness.

The adhesive of the present invention is a heat softenable intimate mixture of components which cooperate to give to the adhesive in molten condition the ability to wet and establish a bond to a desired surface such as metal, a viscosity enabling the molten adhesive to be spread and enter into intimate engagement with the surfaces to be bonded and a consistency of the materials at a joint after cooling, which provides a strong union which is not brittle even at very low temperatures.

The polyepoxide resin component of the preferred adhesive has the special property of wetting metal surfaces. That is, many nonreactive thermoplastic resinous carriers such as the preferred mixture of polyethylene, hydrocarbon resins and polymeric butylene materials are essentially nonpolar in character and hence do not possess the property known as "specific adhesion" for metal, whereas the polyepoxide resins unite strongly to metal possibly forming surface compounds with the metal. The polyepoxide resins while often incompatible with the remaining components of the adhesive are held in uniformly dispersed condition in the extruded rod adhesive, are kept in uniformly dispersed condition in passing through and being softened in a confined heating zone or passageway and remain in uniformly dispersed condition when deposited in a thin film and solidified on a surface. Because of their intimate relation with the remaining components of the adhesive and their specific adhesion toward metal surfaces, the adhesive as a whole is opertaive to bond strongly to metal surfaces.

To perform its purpose in the adhesive, the polyepoxide resin is employed in proportions of from about 10% to about 30% by weight of the adhesive.

Suitable polyepoxide resins include the solid and liquid glycidyl polyethers of a polyhydric phenol, a polyhydric alcohol or both. The polyepoxides may be those produced by reaction of a polyhydric phenol with polyfunctional chlorhydrins such as epichlorhydrin and glycerol dichlorhydrin. Polyhydric phenols for use in forming these resins may be diphenylol propane, bisphenol, hydroquinone, resorcinol and others. Complex epoxides may also be made by reacting polyhydric phenols with simpler polyepoxides to give complex polyepoxides. The preparation of polyepoxide resins is shown in U.S. Patents Nos. 2,506,486 to Bender et al., issued May 2, 1950, and 2,589,245 to Greenlee, issued March 18, 1952.

As explained for example in the Greenlee patent, the epoxide resins may be formed by reaction of polyhydric phenols with a polyfunctional halohydrin such as epichlorhydrin in proportions in excess of that equivalent to the polyhydric phenol and up to twice the equivalent amount. Such reactions give complex polymeric products containing both terminal epoxy groups and terminal hydroxy groups.

Polyethylene is a major component of the preferred adhesive and may constitute from 15% to 60% of the total weight. Relatively high molecular weight polyethylene materials are desirable, such as those having molecular weights in the ranges of from about 7,000 to about 21,000 as determined by viscometric means using a solution of the polyethylene in tetralin at 130° C. and calculating molecular weight by the following equation:

$$M = \frac{K_{cm} \log_{10} \eta_r}{C}$$

where M equals average molecular weight, $\eta_r$ equals relative viscosity, C equals base molar concentration of polymer in tetralin at temperature of determination (equals 4.0 gms. per liter at 130° C.) and $K_{cm}$ equals $4.03 \times 10^{-4}$ gms. per liter of solution at 130° C. Lower molecular weight polyethylenes may be used along with the high molecular weight polyethylenes to reduce the softening point and to vary the flow and other characteristics of the adhesive. The polyethylene material contributes strength and sharp melting and sharp setting up characteristics which are important to bonding at commercially acceptable speeds.

A hydrocarbon resin having at least limited solvent action in molten condition toward the polyethylene may be employed in proportions of from about 20% to 40% by weight of the total composition and operates to flux and dissolve the polyethylene and to improve the character of the polyethylene on setting up. Also, it appears that the resin serves as a reinforcing filler to reduce cold flow in the final adhesive bond. A preferred hydrocarbon resin is a polyterpene resin, specifically a beta pinene polymer. This polymeric material is made in a wide range of melting points, the preferred polymers being those having melting points of from 85° to 125° C. Other hydrocarbon resins possessing a similar action in molten condition include resinous polymerization products obtained by catalytic polymerization of mixed unsaturated monomers derived from cracked petroleum, and fossil resinous materials such as the resin separated from Utah type resin-bearing coal which is described more fully in the United States Patent to Radi No. 2,461,552, dated February 15, 1949, and consists essentially of carbon and hydrogen, has an average molecular weight of about 1,000, a refractive index of 1.544, a specific gravity of from 1.03 to 1.06, and a melting point of from 165° to 180° C., and a fossil rubber resin which consists essentially of carbon and hydrogen, has an acid number of 2, a specific gravity of 1.01 to 1.02, and a melting point of 195 to 205° F.

It is preferred that the polyepoxide resin and hydrocarbon resin be present in the ratio of about 40 parts of polyepoxide to 60 parts of the hydrocarbon resin material but the proportions may range from about equal parts to about 30 parts of the polyepoxide to 70 parts of the hydrocarbon resin.

High molecular weight rubbery polymeric material in proportions of from 10% to 35% of the weight of the adhesive composition gives a flexibility and resistance to cracking to the composition which is important to a rod adhesive for direct through feed adhesive dispensing. In addition, the rubbery polymeric material cooperates in molten condition with the hydrocarbon resin to insure a viscosity and smoothness in the molten composition which enables a uniform deposit of adhesive on surfaces to be joined. The rubbery polymeric material aids in controlling the melting characteristics of the adhesive to give to the rod the property of progressive softening by heat to fluid activated condition in direct through feed adhesive dispensing. In the layer of adhesive deposited to form a joint between surfaces it also provides desirable viscosity to aid in holding the surfaces together during the brief space prior to final setting up of the adhesive.

Rubbery polymeric materials which have been found useful to perform the above-mentioned functions include a high molecular weight rubbery polyisobutylene, i.e. a material having a molecular weight of the order of about 100,000 or may be the material known as "butyl rubber," that is, a sulfur vulcanizable rubbery copolymer of isobutylene and a diolefin, usually isoprene or butadiene, in approximately the proportions of 98 parts isobutylene to two parts of the diolefin. Rubbery copolymers of butadiene and acrylonitrile containing up to 45% of acrylonitrile may also be used.

Use of the thermoplastic rod adhesive for bonding metal foil coated fiber sheet material will be described in connection with the cylindrical container making device 16 shown in Fig. 2. It will be understood that the rod is useful for other bonding operations. The device of Fig. 2 shows a thermoplastic adhesive softening and dispensing system associated with conventional feeding and forming mechanism. A reel 18 of thermoplastic rod adhesive is placed on the shaft 20 carried by the standard 22. Rod adhesive 10 unwound from the reel 18 passes through opposed knurled feeding rolls 24 to which power may be supplied to feed the rod as needed into the entrance port 14 of the melting and applying section of the system. The rod 10 passes from the entrance port 14 of a heating zone including a channel 12 in a metal body 25 where it is softened and reduced to fluid condition by heat supplied by the electrical heating cartridge 26. As the rod 10 moves through the channel 12 it softens progressively and becomes fluid from the outer portions inward; but since the cross sectional areas throughout the length of the channel are not substantially greater than that of the rod, both unsoftened and softened portions of the rod adhesive move forward at approximately the same rate and the intimate mixture of components is maintained. An applying wheel 28 is mounted in a snugly fitting recess 30 in position such that portions of its edge 32 form a side of the channel 12 and its side faces 34 are in heat exchange relation with the metal body 25. As will be observed from the drawing the edge 32 of the applying wheel 28 and the opposite wall of the channel 12 come closer together towards the upper portion of the wheel so that the channel defined between them becomes progressively smaller in cross section. Also, a portion 36 of the wheel 28 projects from the opening 30 in the top of the body for adhesive transfer engagement with articles to be bonded. The position of the wheel 28 may be so fixed with respect to the walls of the channel 12 as to limit to a predetermined thickness the layer 38 of adhesive carried up through the opening 30 by the edge 32 of the applying wheel 28, or an adjustable doctor blade (not shown) may be provided to control the thickness of adhesive carried by the applying wheel. The applying wheel 28 is mounted on a shaft 40 which is driven by a pulley 42 and belt 44. Since the applying wheel 28 is heated by contact with the walls of the block 25 in which it is mounted, it assists in completing the melting and in bringing rod adhesive in the channel to the desired ultimate temperature. The wheel 28 also carries a layer 38 of fluid adhesive of controlled thickness and transfers this adhesive to articles brought in contact with it. Also, because of the heat it carries it may have some effect in insuring completeness of union of the adhesive with a surface brought in contact with it.

The container forming device 16 with which the adhesive supplying system is employed comprises guides 46 in which are deposited blanks 48 to be formed in the device. As shown in Fig. 3, these blanks may be formed of a core 50 of fiberboard or pasteboard or similar sheet material having metal foil sheets 52, for example aluminum foil, joined on its faces. Union of the fiberboard to the metal foil is not a part of the present invention but it is understood that the metal foil is secured to the fiberboard by means of polyvinyl acetate. Blanks 48 are slipped from the bottom of the pile to the slideways 54 and are moved along the slideways by means of conventional feeding mechanism, for example a dog type feed. As illustrated, these blanks 48 are moved so that one edge 56 passes over the exposed portion 36 of the applying wheel 28 for deposition thereon of a band 58 of the fluid thermoplastic rod adhesive. A presser roll 60 for holding a blank 48 in firm contact with the applying wheel 28 is rotatably mounted on a shaft 62 which is carried at the end of an arm 64 rotatably mounted on a shaft 66 carried by the standard 68. Pressure on the wheel 60 to force the blank into contact with the applying wheel may be supplied by the weight of the wheel and arm or as shown may be supplemented by a spring 70, suitably a coil spring such as that shown in Fig. 2, which is wound around the shaft 66 to which it is fixed at one end, the other end projecting out and being passed through an opening 72 in the arm 64. The transfer of adhesive from the applying wheel 28 to the blank 48 and the action of the wheel 60 in holding the blank against the applying wheel are shown in Fig. 4. The ribbon or band 58 of adhesive carried by the blank 48 after it leaves the applying wheel 28 is shown in Fig. 5. The blank 48 with ribbon 58 of hot fluid adhesive thereon is moved to position above the forming horn 74 and is bent around the horn by the reciprocating forming wings 76 which are carried and caused to function by the supporting arms which are actuated by suitable mechanism (not shown). When the blank 48 has been formed around the horn, with the edges 56 and 78 overlapping, the bumping bar 80 is moved to the position shown in Fig. 2 to press the cemented edge portion 56 of the blank 48 against the opposite edge portion 78 of the blank to establish a bond between them. The formed and bonded cylindrical container body is then pushed off of the horn 74 and the cycle is repeated.

The following examples are given to aid in understanding the invention but it is to be understood that the invention is not restricted to the particular proportions or reagents employed in the examples:

*Example I*

| | Parts by weight |
|---|---|
| Polyethylene (DYLT), mol. wt. 18,000 | 39 |
| B-pinene polymer resin, melting point 125° C. | 29.4 |
| Copolymer of about 98 parts isobutylene and 2 parts isoprene | 10 |
| Epoxide resin having an epoxide equivalent of 870 to 1025 and a melting point of 95° to 105° C. | 19.6 |
| Antioxidant | 2 |

The B-pinene polymer resin was introduced into a Reed mixer and melted by bringing its temperature to about 160° C. The copolymer material was then added and mixed in and the temperature lowered to about 130° C. When the mixture was smooth the temperature was raised to 150° C. and the polyethylene and antioxidant were added and mixed until the composition was smooth. Thereafter the polyepoxide resin was added and thoroughly mixed and the mixture was extruded as a ¼" rod, the extrusion temperature being about 210° F. The extruded rod was coiled on a reel and was readily uncoiled for use with a direct through feed cementing system.

The rod obtained was somewhat cloudy in appearance; and the surface of the rod became whitish when the rod was stretched. These factors show that although the rod was flexible and non-brittle the components in the rod were not compatible. A mass of the rod was heated to fluid condition in a pot and in a relatively short time gave evidence of separation.

When used in a container making apparatus such as shown in Fig. 2, the adhesive was brought to a temperature of about 370° in passing through the channel 12 and around the cement applying wheel 28. The applying device was set to carry a film 38 of molten adhesive of a thickness of 0.012" which deposits a ribbon 58 of adhesive approximately 0.003" in thickness on the blank 48 passing in contact with the wheel 28. The blank 48 was passed to the forming horn 74 where the blank 48 was bent around the horn 74 by the wings 76 and the overlapping edge portions 56 and 78 were pressed into final adhesive engagement by the bumping bar 80. Approximately two-tenths of a second elapsed between the time of adhesive application to the blank and the time of joining the overlapping portions of the blank. The formed and bonded can is removed from the forming horn and has a crimped metal end formed on one end, is filled with a desired material and has a crimped metal end applied to the remaining open end of the container.

*Example II*

| | Parts by weight |
|---|---|
| Polyethylene, mol. wt. 18,000 | 45 |
| Copolymer of about 98 parts isobutylene and 2 parts isoprene | 10 |
| B-pinene polymer resin, melting point 125° C. | 27 |
| Epoxide resin having an epoxide equivalent of 870 to 1025 and a melting point of 95 to 105° C. | 18 |
| Antioxidant | 2 |

This formulation was prepared and formed into a rod according to the same procedure and was useful in the same relationships as the adhesive of Example I. This rod also evidenced incompatibility of its components.

Example III

| | Parts by weight |
|---|---|
| Polyethylene, mol. wt. 18,000 | 43 |
| Butadiene acrylonitrile copolymer containing 35% acrylonitrile | 12 |
| B-pinene polymer resin, melting point 125° C. | 27 |
| Epoxide resin having an epoxide equivalent of 870 to 1025 and a melting point of 95° to 105° C. | 18 |
| Antioxidant | 2 |

The B-pinene polymer resin was introduced into a Reed mixer and melted by bringing its temperature to about 160° C. The butadiene acrylonitrile copolymer was then added and mixed in and thereafter the polyethylene, epoxy resin and antioxidant were added and mixed until the composition was smooth. The mixture was extruded as a ¼" rod at an extrusion temperature of about 210° F. and the extruded rod was coiled on a reel. The rod, though showing evidences of incompatibility, was non-brittle and readily uncoiled for use with a direct through feed cementing system.

The rod adhesive was useful in a container making apparatus as a replacement for the adhesive described under Example I.

Example IV

| | Parts by weight |
|---|---|
| Polyethylene, mol. wt. 18,000 | 40 |
| Copolymer of about 98 parts isobutylene and 2 parts isoprene | 10 |
| Epoxide resin having an epoxide equivalent of 870 to 1025 and a melting point of 95° to 105° C. | 20 |
| Fossil rubber resin: specific gravity 1.01, acid No. 2 and melting point 195° to 205° F. | 30 |
| Antioxidant | 2 |

This formula was prepared and formed into a rod according to the same procedure and was useful in the same relationships of the adhesive of Example I. The rod showed evidences of incompatibility.

Example V

| | Parts by weight |
|---|---|
| Polyethylene, mol. wt. 18,000 | 45 |
| Copolymer of about 98 parts isobutylene and 2 parts isoprene | 10 |
| B-pinene polymer resin, melting point 125° C. | 27 |
| Epoxide resin having an epoxide equivalent of 225 to 290 and a melting point of 20° to 28° C. and normally present as a semi-solid | 18 |
| Antioxidant | 2 |

This composition was prepared by combining the ingredients in a Reed mixer at a temperature of 300° F. The mixture was extruded as a ¼" rod at an extrusion temperature of about 210° F. The extruded rod was coiled on a reel and was readily uncoiled for use with a direct through feed cementing system. This rod showed little or no evidence of incompatibility when tested as outlined in Example I.

When used in a container making apparatus such as shown in Fig. 2, the adhesive was brought to a temperature of about 370° F. in passing through the channel and around the cement applying wheel. A ribbon of adhesive approximately 0.003" in thickness was deposited on a blank piece in contact with the wheel and the blank was formed and the overlapping edge portions pressed into final adhesive engagement.

The adhesive showed excellent ability to wet the metal foil surface and the resultant bond was quite strong. When the joint was pulled apart, the failure occurred in the paper rather than at the joint. In a standard cold flow test at 91° C., a 1" bond did not separate in a period of more than 8 hours with a 25 lb. weight.

Having thus described my invention, what I claim as new and desire to secure by Letters Patent of the United States is:

1. As a new article of manufacture, a supply body of solid heat softenable adhesive reducible progressively by heat to a fluid condition in quantities as needed for use in a direct through feed industrial cement applying and dispensing system, said supply body comprising a coil having a plurality of turns of uniform rod composed of a heat softenable intimate mixture containing from 10% to 30% by weight of an epoxy resinous glycidyl polyether containing terminal epoxy groups and from 90% to 70% by weight of heat softenable resinous material containing polyethylene as a major component, said resinous material being substantially nonreactive with said epoxy resinous glycidyl polyether, the cross section of said rod being from ⅛" to ¼" in thickness, the physical properties of said rod including the characteristics that said rod is self supporting, dry, and sufficiently stiff to be fed longitudinally but adequately flexible to be coiled for storage and uncoiled for use as needed without cracking.

2. As a new article of manufacture, a supply body of solid heat softenable adhesive reducible progressively by heat to a fluid condition in quantities as needed for use in a direct through feed industrial cement applying and dispensing system, said supply body comprising a uniform rod composed of a heat softenable intimate mixture containing from 10% to 30% by weight of an epoxy resinous glycidyl polyether containing terminal epoxy groups, and from 90% to 70% by weight of heat softenable resinous material including polyethylene as a major component incompatible in fluid condition with and tending to separate from said epoxy resinous material and also being substantially nonreactive with said epoxy resinous glycidyl polyether, the physical properties of said rod including the characteristics that said rod is self supporting, dry, and sufficiently stiff to be fed longitudinally for use as needed in said applying and dispensing system.

3. As a new article of manufacture, a supply body of solid heat softenable adhesive reducible progressively by heat to a fluid condition in quantities as needed for use in a direct through feed industrial cement applying and dispensing system, said supply body comprising a uniform rod composed of a heat softenable intimate mixture containing from 10% to 30% by weight of an epoxy resinous glycidyl polyether containing terminal epoxy groups, from 15% to 60% by weight of polyethylene, from 20% to 40% by weight of an essentially hydrocarbon resin having a softening point of at least 85° C. possessing in heated condition at least limited solvent power toward said polyethylene and from 10% to 35% by weight of a rubbery polymer, the physical properties of said rod including the characteristics that said rod is self supporting, dry, and sufficiently stiff to be fed longitudinally for use as needed in said applying and dispensing system.

4. As a new article of manufacture, a supply body of solid heat softenable adhesive reducible progressively by heat to a fluid condition in quantities as needed for use in a direct through feed industrial cement applying and dispensing system, said supply body comprising a uniform rod composed of a heat softenable intimate mixture containing from 10% to 30% by weight of an epoxy resinous glycidyl polyether containing terminal epoxy groups, from 15% to 60% by weight of polyethylene, from 20% to 40% by weight of an essentially hydrocarbon resin having a softening point of at least about 85° C. possessing in heated condition at least limited solvent power toward said polyethylene and from 10% to 35% by weight of high molecular weight isobutylene polymeric material, the physical properties of said rod including the characteristics that said rod is self supporting, dry, and sufficiently stiff to be fed longitudinally for use as needed in said applying and dispensing system.

5. As a new article of manufacture, a supply body of solid heat softenable adhesive reducible progressively by heat to a fluid condition in quantities as needed for use in a direct through feed industrial cement applying and dispensing system, said supply body comprising a uniform rod composed of a heat softenable intimate mixture containing from 10% to 25% by weight of an epoxy resinous glycidyl polyether of a polyhydric phenol, said epoxy resinous material containing terminal epoxy groups, from 15% to 60% by weight of polyethylene, from 20% to 40% by weight of at least one member of the group consisting of polyterpene resins having a softening point of at least about 85° C., the resin separated from Utah resin-bearing coal and the resinous polymerization product obtained by catalytic polymerization of a mixture of unsaturated monomers derived from deep cracking petroleum, and from 10% to 35% by weight of an uncured sulfur-vulcanizable rubbery copolymer of isobutylene and a diolefin in approximately the proportions of 98:2, the physical properties of said rod including the characteristics that said rod is self supporting, dry, and sufficiently stiff to be fed longitudinally for use as needed in said applying and dispensing system.

6. A method of bonding a metal work surface to another surface comprising the steps of providing a slender, self-supporting rod of solid adhesive comprising a heat softenable intimate mixture of from 10% to 30% by weight of an epoxy resinous glycidyl polyether containing terminal epoxy groups and from 90% to 70% by weight of heat softenable resinous material containing polyethylene as a major component, said resinous material being incompatible in fluid condition and substantially nonreactive with said epoxy resinous glycidyl polyether, the physical properties of said rod including the characteristics that said rod is dry and sufficiently stiff to be fed longitudinally for use as needed to supply adhesive material, the cross section of said rod being substantially uniform, introducing a forward portion only of said rod of adhesive into an elongated heating zone, confining the adhesive in said heating zone to a cross sectional area not substantially greater than the cross sectional area of said rod, applying heat to said forward portion of the rod to soften said portion only of the adhesive rod to fluid condition, progressively introducing further portions of the adhesive rod into the heating zone to insure orderly movement of adhesive in intimately mixed condition through said heating zone, transferring fluid adhesive from the heating zone to said work surface while still in intimately mixed condition, and pressing said other surface against the adhesive on said work surface.

7. A method of bonding metal foil coated fiber sheets comprising the steps of providing a slender, self-supporting rod of solid adhesive comprising a heat-softenable intimate mixture of from 10% to 30% by weight of an epoxy resinous glycidyl polyether containing terminal epoxy groups, from 50% to 60% by weight of polyethylene, from 20% to 40% by weight of an essentially hydrocarbon resin having a softening point of at least 85° C. possessing in heated condition at least limited solvent power toward said polyethylene and from 10% to 35% by weight of a rubbery polymer, the physical properties of said rod including the characteristics that said rod is dry and sufficiently stiff to be fed longitudinally for use as needed to supply adhesive material, the cross section of said rod being substantially uniform, introducing a forward portion only of said rod of adhesive into an elongated heating zone, confining the adhesive in said heating zone to a cross sectional area not substantially greater than the cross sectional area of said rod, applying heat to said forward portion of the rod to soften said portion only of the adhesive rod to fluid condition, progressively introducing further portions of the adhesive rod into the heating zone to insure orderly movement of adhesive in intimately mixed condition through said heating zone, transferring fluid adhesive from the heating zone to a surface of a metal foil coated fibrous sheet while still in intimately mixed condition, and pressing a surface of a second metal foil coated fiber sheet against the adhesive on the first metal foil coated fiber sheet.

References Cited in the file of this patent

UNITED STATES PATENTS

| | | |
|---|---|---|
| 2,278,141 | Warth | Mar. 31, 1942 |
| 2,506,486 | Bender et al. | May 2, 1950 |
| 2,510,727 | Sussenbach | June 6, 1950 |
| 2,602,785 | Wiles et al. | July 8, 1952 |
| 2,604,464 | Segall et al. | July 22, 1952 |
| 2,609,963 | Watson et al. | Sept. 9, 1952 |
| 2,682,515 | Naps | June 29, 1954 |
| 2,700,860 | Paulsen | Jan. 25, 1955 |
| 2,707,708 | Wittcoff | May 3, 1955 |
| 2,762,716 | MacKenzie | Sept. 11, 1956 |

FOREIGN PATENTS

| | | |
|---|---|---|
| 133,819 | Australia | Aug. 10, 1949 |

OTHER REFERENCES

Modern Plastics, September 1954, "Alloying with Epoxies," pp. 155–157, 160–161 and 240–243.